United States Patent [19]

Bonham, Jr.

[11] Patent Number: 4,930,316

[45] Date of Patent: Jun. 5, 1990

[54] GEOTHERMAL PLANT NONCONDENSABLE GAS REMOVAL AND HEAT RECOVERY SYSTEM AND METHOD

[75] Inventor: Enos A. Bonham, Jr., Baton Rouge, La.

[73] Assignee: Magma Power Company, San Diego, Calif.

[21] Appl. No.: 217,162

[22] Filed: Jul. 11, 1988

[51] Int. Cl.$^5$ ............................................. F03G 7/00
[52] U.S. Cl. ................................. 60/641.5; 60/641.2
[58] Field of Search ................. 60/641.2, 641.3, 641.4, 60/641.5

[56] References Cited

U.S. PATENT DOCUMENTS

| | | | |
|---|---|---|---|
| 3,893,299 | 7/1975 | Hutchinson et al. | 60/641.5 |
| 3,988,895 | 11/1976 | Sheinbaum | 60/641.3 |
| 4,057,964 | 11/1977 | Hutchinson | 60/641.5 |
| 4,144,715 | 3/1979 | Fleck et al. | 60/641.3 |
| 4,319,895 | 3/1982 | Kemmer | 60/641.5 X |
| 4,534,174 | 8/1985 | Awerbuch et al. | 60/641.5 |
| 4,718,236 | 1/1988 | Awerbuch et al. | 60/641.5 |

*Primary Examiner*—Allen M. Ostrager
*Attorney, Agent, or Firm*—Albert L. Gabriel

[57] ABSTRACT

In a geothermal electric power generating plant of the type wherein a flow stream of hot geothermal brine from a production well is partially flashed to steam for turbine motive power, system and method for removing most of the entrained noncondensable gas content of the brine proximate the high temperature end of the plant, while at the same time recovering most of the heat energy from steam necessarily released with the noncondensable gases. The noncondensable gases such as carbon dioxide, hydrogen sulfide, ammonia, and boric acid, together with a substantial amount of high pressure, high temperature steam, are separated from the brine flow stream before its entry into conventional flash portions of the plant. A heat exchange system is employed to transfer heat from the separated steam and its condensate and from the separated gases to substantially pure turbine exhaust water condensate so as to boil the pure water for turbine motive steam. The resulting heat loss from the separated steam condenses it and thereby separates out the noncondensable gases. Removal of the noncondensables enables a substantial increase in net plant power output to be achieved, and substantially reduces plant capital costs and maintenance expenses.

54 Claims, 1 Drawing Sheet

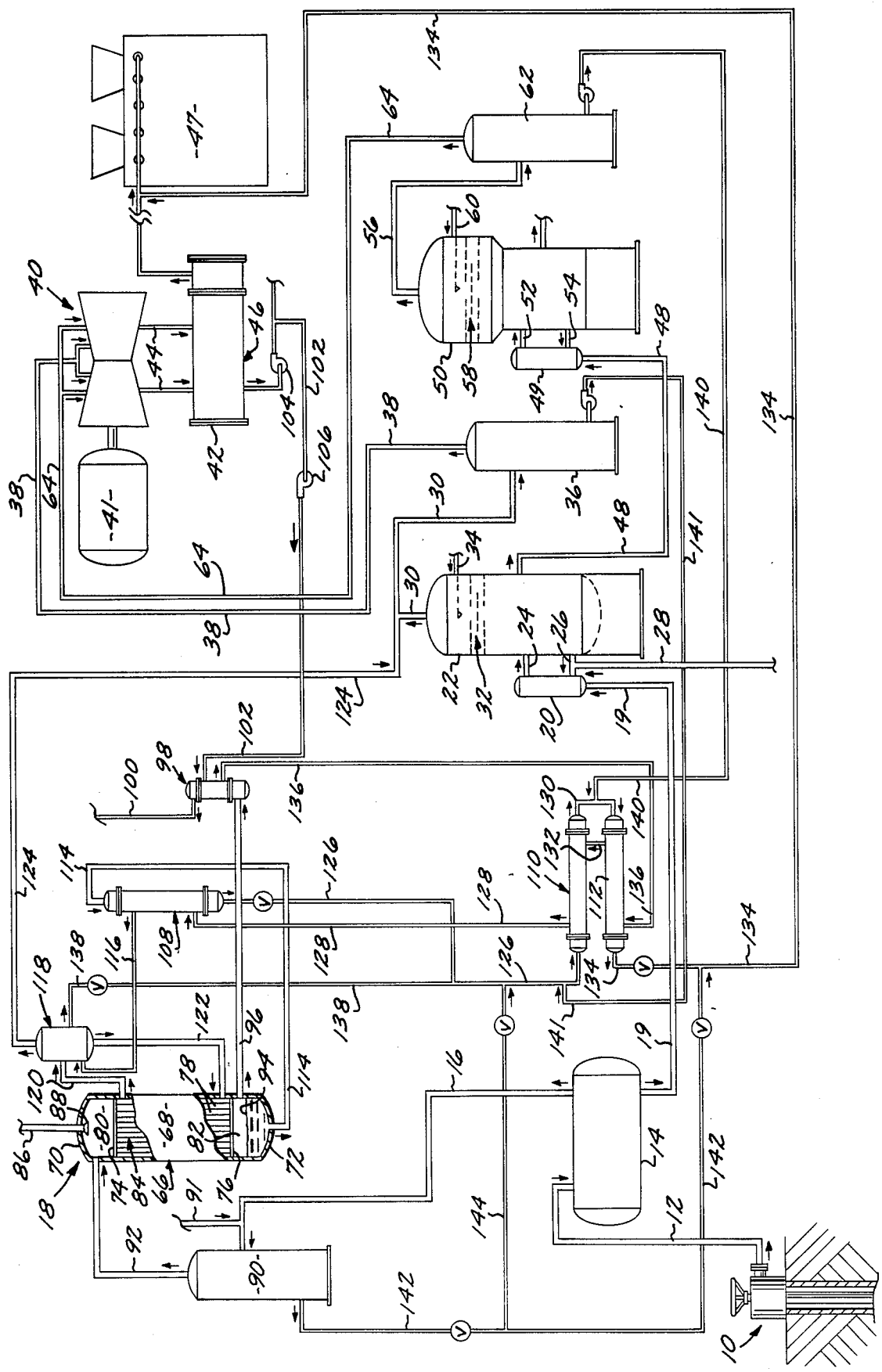

GEOTHERMAL PLANT NONCONDENSABLE GAS REMOVAL AND HEAT RECOVERY SYSTEM AND METHOD

BACKGROUND OF THE INVENTION

1. Field of the Invention

The present invention is in the field of electrical power production from steam flashed from high temperature geothermal brines which have high noncondensable gas content, most of the components of which are "acid gases."

2. Description of the Prior Art

Some high temperature geothermal brine resources are known which contain very large amounts of geothermal energy, but which until fairly recently had not been usable for the commercial production of electrical power because of a high dissolved silica content, and which also have a large noncondensable gas content, most of the components of which are acid gases such as carbon dioxide, boric acid, and hydrogen sulfide. Thus, the Salton Sea Known Geothermal Resources Area (KGRA), otherwise known as the Salton Sea Geothermal Anomaly, is estimated to have approximately 3,400 $MW_e$ of geothermal energy available for the generating of electrical power, which is believed to be self-regenerating by percolating waters. The KGRA geothermal resource is estimated to be a greater energy reserve even than the oil reserves on the north slope of Alaska. A similar geothermal resource is the Brawley geothermal field which is also in the Imperial Valley of Calif. Development of these large geothermal resources was almost completely blocked until relatively recently by the high dissolved silica content, which precipitated out in vessels and piping in power production plants to the extent of up to about 42 inches per year of scaling. This problem was resolved by Magma Power Company, now of Rancho Bernardo, San Diego County, Calif., by flashing the geothermal brine to steam for generating electrical power in a series of flash crystallizers in which the dissolved silica was precipitated out on a vast silica seed particle area rather than on surfaces of flash vessels and associated piping and valves. The use of flash crystallizers for this purpose was taught in the Featherstone U.S. Pat. No. 4,429,535, while retrieval of the silica seed particles useful for the purpose was taught in Van Note U.S. Pat. Nos. 4,302,328 and 4,304,666. Applicant's U.S. Pat. No 4,665,705 teaches an improvement over the Featherstone patent disclosure in which the flash crystallizers are made more effective by the use of external draft tubes which produce brine recirculation motive power for multifold recirculation of the geothermal brine through the flash crystallizers to provide time for silica precipitation on the silica seed particles.

Despite the foregoing solution to the silica precipitation problem, there nevertheless remained serious problems of inefficiency, corrosion, salt fouling, and undesirably high capital costs in geothermal electrical power production plants located in high temperature geothermal brine regions such as the Salton Sea Geothermal Anomaly, because of the presence of large quantities of noncondensable gases, most of which are acid gases. The specific problems caused by the presence of these noncondensable gases will be described in detail below.

Where high temperature geothermal brine is available as in the Salton Sea Geothermal Anomaly, at production well source temperatures on the order of 550° F. or more, the conventional and most efficient practice is to flow the brine up through the production well and pressurize the brine through the plant under the power of its own flashing steam. For example, a geothermal brine well drilled and owned by Magma Power Company in the Salton Sea Geothermal field has a bottom hole temperature of approximately 550° F., and with the brine flowing up through and out of the well under the power of its own flashing steam, about 11 percent of the total brine flow has flashed to steam by the time the brine reaches the wellhead, which represents about one-third of the steam power available from the brine. Almost all of the noncondensable gases (excepting only a slight amount dissolved in the liquid brine) are mixed with the flashed steam at the wellhead, the noncondensable gases amounting to more than 2.5 percent of the flashed steam at the wellhead.

Prior to the present invention, the conventional practice with such high temperature brines has been to allow the noncondensable gases to be carried through the geothermal production plant so that the noncondensables were mixed with the steam which drove the power generating turbine. This resulted in the noncondensables causing the numerous problems detailed below. These problems can be almost completely eliminated by removing the noncondensable gases at the high temperature end of the production plant, that is, removing the noncondensables from the brine feedline from the geothermal production well to the plant. However, prior to the present invention, there has been no satisfactory way known in the art to remove the noncondensables at the high temperature end of the plant, and hence to remove them from the steam which drives the turbine. To simply vent the noncondensable gases to the atmosphere at the high temperature end of the plant would necessarily also cause venting of the already-flashed steam, and hence loss of approximately one-third of the available steam energy, which would be an intolerable waste of available power. To vent only a fraction of the noncondensable gases and a proportionate fraction of the steam at the high temperature end of the plant would still waste a large amount of valuable high pressure, high temperature steam, and would leave the problems caused by the noncondensable gases still generally uncured.

Applicant is aware of three prior art patent disclosures of some noncondensable gas separation at the high temperature end of a geothermal electric power production plant. The first of these was the McCabe et al. U.S. Pat. No. 4,428,200, which showed a noncondensable gas separator in the production well outlet pipe in the forms of that invention shown in FIGS. 2 and 4. The purpose for separating noncondensable gases was to provide them as a replacement for more reactive atmospheric oxygen in the reinjection system part of the plant, and also to slightly pressurize the reinjection system. The amount of noncondensable gases separated was necessarily only a relatively very small amount for the purpose, and the heat energy of the accompanying steam and that of the noncondensable gases was totally wasted as far as power generation was concerned, since it was only applied to the reinjection system. Noncondensable gas separators at the high temperature end of the plants were also disclosed in the aforesaid Featherstone U.S. Pat. No. 4,429,535 and in applicant's aforesaid U.S. Pat. No. 4,665,705. While no purpose was stated in either of these patents for the presence of a noncondensable gas separator, it is applicant's understanding that in each case it involved separation of only a small amount of the noncondensable gases, and that the purpose was to help alleviate a foaming problem in the brine from the production well. In each case, the noncondensable gases, and necessarily some of the high temperature, high pressure steam, was simply vented to atmosphere, so that the heat energy of the accompanying steam as well as that of the noncondensable gases was totally wasted.

The problems which result from the current practice of allowing the noncondensable gases to flow through the plant with the brine and flashing steam and thereby pass through the generating turbine with the steam include the following:

1. The noncondensable gases in the turbine exhaust will accumulate in the exhaust condensor unless they are removed from the condensor by being compressed up to atmospheric pressure for rejection to the atmosphere. When the steam from the turbine exhaust condenses, the noncondensables remain in gaseous form, and they must be removed in order to maintain the highest possible condensor vacuum and corresponding maximum turbine efficiency. This requires a large amount of power which is generally derived from steam that would otherwise be available to the generating turbine. For example, in a geothermal generating plant having a net power output of approximately 34 megawatts, about 25,000 pounds per hour of motive steam would be required for pressurization and removal of the noncondensable gases from the turbine exhaust condensor, for brine produced by the aforesaid Magma Power Company well in the Salton Sea geothermal field. This represents at least about 1.2 megawatts of power, or at least about 3.4 percent of the available power from steam, which is a considerable power loss for the plant.

2. Additional generating energy is lost with the conventional practice of allowing the noncondensable gases to pass through the plant and be mixed with the steam applied to the turbine, because the presence of the noncondensable gases in the turbine exhaust prevents an optimum vacuum from being drawn in the exhaust condensor, even though the noncondensables are continuously being pressurized and removed. Maximum power output from the turbine is completely dependent upon the deepest possible vacuum being drawn in the condensor, and this is substantially impaired by the presence of noncondensables.

3. The presence of the noncondensable gases in the turbine exhaust in a conventional geothermal plant requires that the turbine exhaust condensor be considerably larger in size than it would need to be without the noncondensable gases, so that the condensor represents an undesirably high capital cost in the conventional plant.

4. Another undesirably high capital cost in the conventional geothermal power plant resides in the compression system of pumps and ejectors required to compress the noncondensable gases in the turbine exhaust back up to atmospheric pressure for ejection into the atmosphere.

5. A further undesirably high capital cost in the conventional geothermal power plant is caused by exotic and expensive metallurgy necessary for the turbine to combat acids formed in the condensing steam by the presence of the noncondensable gases, which are mostly acid gases such as carbon dioxide, boric acid, and hydrogen sulfide. The resulting turbine corrosion also results in continuing capital replacement costs over the life of the plant.

6. In a conventional geothermal power plant, the presence of the noncondensable gases in the turbine motive steam also creates a substantial salt fouling potential. Various constituents of the noncondensables have a high potential for chemically reacting with each other to produce a variety of salts, and also for reacting with plant equipment to produce ferrous and/or ferric salts.

SUMMARY OF THE INVENTION

In view of these and other problems in the art, it is an object of the present invention to substantially increase the net power output of a geothermal brine steam turbine electric power generating plant by removing noncondensable gases from the flow of brine and flashing steam upstream of the turbine so as to avoid the large expenditure of power conventionally required for removing noncondensable gases from the turbine exhaust.

Another object of the invention is to further increase the net power output of such a geothermal brine generating plant by removal of noncondensable gases upstream of the turbine so that a deeper, more efficient vacuum can be drawn at the turbine exhaust than is conventionally possible.

Another object of the invention is to minimize the size and hence capital cost of the turbine exhaust condensor in a geothermal brine power plant by removal of noncondensable gases upstream of the turbine.

A further object of the invention is to further minimize capital cost in a geothermal brine power plant by removing noncondensable gases upstream of the turbine and thereby greatly reducing the size and cost of pumps and ejectors conventionally required to compress noncondensable gases in the turbine exhaust back up to atmospheric pressure for ejection into the atmosphere.

A further object of the invention is to reduce both initial and replacement capital costs in a geothermal brine power plant by removing noncondensable acid gases upstream of the turbine, thereby greatly reducing turbine corrosion and the necessity for exotic and expensive turbine metallurgy.

A further object of the invention is to minimize salt fouling potential in the turbine of a geothermal brine generating plant by substantial elimination of reactive noncondensable gases from steam which condenses in the turbine and its exhaust.

Another, more specific object of the invention is to provide, in a geothermal brine power generating plant, method and apparatus for substantially completely removing noncondensable gases such as carbon dioxide, hydrogen sulfide, ammonia, and boric acid from steam which is flashed from the brine before the steam is used as turbine motive power.

A still further object of the invention is to provide, in a geothermal brine power plant, method and apparatus for removing noncondensable gases from the flow of geothermal brine and flashing steam upstream of the turbine, while at the same time recovering and utilizing the heat energy from steam that is necessarily associated with the noncondensable gases during their removal.

Another object of the invention is to provide, in a geothermal brine power generating plant, method and apparatus for removing the noncondensable gases from the flowing brine and associated flashing steam at the high temperature end of the plant so that the noncondensables do not enter conventional portions of the plant including the generating turbine and its associated condensor system, while at the same time recovering most of the heat energy contained in the high temperature, high pressure steam which is necessarily associated with the removed noncondensables at the high temperature end of the plant.

A further object of the invention is to provide a geothermal plant noncondensable gas removal system wherein substantially pure water condensate from the turbine exhaust is reheated to turbine power generating steam in a heat exchanger system which recovers most of the heat energy from steam necessarily released with the noncondensables when they are removed from the brine flow stream.

A further object of the invention is to provide a geothermal plant noncondensable gas removal system of the character described wherein the water condensate from the turbine exhaust is further heated in a preheater heat exchanger which transfers heat energy from the high temperature noncondensables removed from the brine flow stream.

A further object of the invention is to provide a geothermal plant noncondensable gas removal system of the character described which embodies a heat exchanger of the vertical thermosiphon reboiler type wherein high temperature, high pressure steam necessarily associated with the noncondensables condenses to both release the noncondensables from the steam for removal from the system, heat energy from such condensing causing reboiling of substantially pure water condensate from the turbine exhaust for added turbine motive steam.

A still further object of the invention is to provide a geothermal plant noncondensable gas removal system of the character described wherein water condensate from the turbine exhaust is preheated to an almost-boiling condition prior to its entry into said vertical thermosiphon reboiler in a series of cross-exchanger heat exchangers by hot water condensate from the reboiler which has condensed in the reboiler while giving off heat to reboil said water condensate from the turbine exhaust.

Yet a further object of the invention is to provide a geothermal plant noncondensable gas removal system of the character described wherein said vertical thermosiphon reboiler is closely coupled with a steam separator drum in a recirculation circuit for recirculating pure water condensate from the turbine exhaust a number of times for continuously reboiling the pure water condensate, with high temperature, high pressure steam separated in the separator drum being directed to the turbine.

According to the invention, the incoming hot geothermal brine from a production well is first passed through a high pressure, high temperature separator at the high temperature end of a geothermal brine electric power generating plant before the brine is directed to conventional portions of the plant such as those disclosed in the aforesaid Featherstone U.S. Pat. No. 4,429,535 and applicant's aforesaid U.S. Pat. No. 4,665,705. A sufficient pressure drop is permitted in this high pressure, high temperature separator to cause separation of almost all of the noncondensable gases from the brine stream, but to achieve such noncondensable gas separation a relatively large proportion of the high pressure, high temperature steam from the brine flow stream must also be released with the noncondensable gases. This steam represents as much as about one-third of the potentially usable heat energy from steam derived from the production well. This separated combination of noncondensable gases and high pressure, high temperature steam is passed through the system of the invention to remove the noncondensable gases and pass them to the atmosphere, while at the same time recovering the heat energy from the steam and utilizing it as turbine motive power.

The system of the invention comprises a series of heat exchangers in which the noncondensable gases are separated out from the associated steam by condensation of that steam, and the heat from that steam and its condensate is transferred to relatively very pure turbine exhaust condensate water which is reboiled and directed to the turbine as additional turbine motive power. The highest temperature of these heat exchangers is preferably in the form of a vertical thermosiphon reboiler within which the combined separated noncondensables and steam are passed downwardly through the tube side, with the steam portion condensing while giving up its heat of vaporization to boil the pure condensate from the turbine exhaust in the shell side. A steam separator drum is closely physically associated with the shell side of the thermosiphon reboiler in a recirculation loop for separating out clean steam which boils up in the reboiler shell side, such separated steam being directed to high pressure inputs of the turbine.

Substantially pure turbine exhaust condensate is derived from the hotwell of the main turbine condensor and is pressurized and flowed through a sequence of heat exchangers in which it is heated to close to its boiling point under its pressurized condition for entry into the thermosiphon reboiler shell side in which it is reboiled. This substantially pure condensate first passes through a small preheater heat exchanger in which it receives a first increment of heat from the out-passing noncondensable gases that are separated out in the tube side of the thermosiphon reboiler, the noncondensable gases then being distributed to the atmosphere, preferably with the large airflow through the plant cooling tower. Then the turbine exhaust condensate is further sequentially heated in a series of cross-exchange heat exchangers in preparation for boiling in the shell of the thermosiphon reboiler, these cross-exchange heat exchangers being heated by a flow-through of the condensate from steam which has condensed in the tube side of the thermosiphon reboiler.

With the system of the invention, the noncondensable gases are effectively removed from the brine flow stream so that the plant, and particularly the turbine and its condensor system, are substantially completely protected from the adverse effects listed above which are conventionally associated with the presence of noncondensable gases; while at the same time substantially all of the useful heat energy in the high pressure, high temperature steam necessarily separated out with the noncondensable gases, and the heat energy in the noncondensable gases themselves, is utilized for turbine motive power.

BRIEF DESCRIPTION OF THE DRAWING

These and other objects of the invention will become more apparent in view of the following description and accompanying drawing, wherein:

The single FIGURE is a diagrammatic view illustrating a presently preferred embodiment of the invention, with the vertical thermosiphon reboiler employed in the invention shown partly in section and partly in elevation.

DETAILED DESCRIPTION

The drawing illustrates the system of the present invention for removal of most of the noncondensable gases associated with the brine from a high temperature geothermal well at the high temperature end of a geothermal electric power production plant of the type disclosed in applicant's prior U.S. Pat. No. 4,665,705, or of the type disclosed in the aforesaid Featherstone U.S. Pat. No. 4,429,535. According to the invention, high temperature geothermal brine from one or more production wells is first applied to one or more vapor separators which separate some high temperature, high pressure steam from the brine, while at the same time separating most of the noncondensable gases from the brine. Such separated steam and noncondensable gases are processed according to the method and apparatus of the present invention to eliminate the noncondensable gases, while at the same time recovering most of the heat energy from the steam necessarily separated from the brine with the noncondensable gases, and heat energy from the noncondensable gases themselves. The remaining brine after such separation is then processed according to the method and apparatus of applicant's prior U.S. Pat. No. 4,665,705 or of the aforesaid Featherstone U.S. Pat. No. 4,429,535, the heat energy therefrom being recovered in a series of flash crystallizers, and the large quantity of dissolved silica therefrom being precipitated out in particulate form in the flash crystallizers and also preferably in a subsequent reactor clarifier.

Referring to the single figure of the drawing, a geothermal production well generally designated 10 provides underground access to hot geothermal brine of the type to which the present invention is applicable, namely, hot geothermal brine which is particularly attractive as a source of heat energy for the production of electrical power because of its high temperature, but which has the undesirable characteristic of substantial noncondensable gas content. Because of the limitations of prior art technology in the field, such noncondensable gas content heretofore substantially reduced the net electrical power output because of the necessity for utilizing considerable power to compress and eject noncondensables out of the steam turbine exhaust condensor system. It also made geothermal electric power production plants considerably more expensive to fabricate and maintain because the presence of the noncondensables in the power generating steam required more exotic turbine metallurgy and considerable noncondensable gas removal equipment associated with the turbine condensor system. Additionally, chemical deposits on turbine blades and nozzles resulting from the presence of noncondensable gases in the power generating steam required difficult turbine cleaning procedures to be employed, with substantial power shutdown time associated with turbine cleaning.

The principal physical characteristic of the hot geothermal brine to which the present invention is applied is that it have a sufficiently high underground source temperature to enable the brine to be flowed up through the well or wells under the power of its own flashing steam, yet with the brine temperature still remaining sufficiently high at the wellhead for efficient operation of one or more electrical power generating turbines directly from steam separated from the geothermal brine. For this purpose, it is preferred that the source or bottom hole temperature of the geothermal brine be at least approximately 450° F., and the wellhead temperature be at least approximately 350° F. An example of a geothermal resource to which the present invention is particularly applicable is the Salton Sea geothermal field, sometimes referred to as the "Salton Sea Geothermal Anomaly," located proximate the Niland region of the Imperial Valley in Calif. Another example of a geothermal resource to which the present invention applies is the Brawley geothermal field, also in the Imperial Valley. By way of example only, and not of limitation, an example well in the Salton Sea geothermal field drilled and owned by Magma Power Company based in Rancho Bernardo, Calif., has a bottom hole temperature of approximately 550° F. at a pressure of approximately 1250 psia (pounds per square inch absolute), with a total flow of approximately 3,000,000 pounds per hour. Included in this flow is approximately 2,233,800 pounds per hour of water in both liquid and steam phases, approximately 757,500 pounds per hour of dissolved solids, and approximately 8,622 pounds per hour of carbon dioxide and other noncondensable gases, as well as approximately 78 pounds per hour of the noncondensable gas hydrogen sulfide.

Referring again to the drawing, the hot geothermal production well 10, which will be assumed by way of example to have the foregoing physical characteristics, delivers the brine and associated flashed steam through one or more supply conduits 12 to one or more high pressure separators 14, which are preferably horizontal separators. Although only a single production well 10, supply conduit 12, and separator 14 are shown and described herein, it is to be understood that any number of such components in parallel may be employed in a geothermal electric power production plant according to the invention. Similarly, only a single series of noncondensable gas removal and heat recovery components is shown and described herein, while it is to be understood that any number of such components may be provided in parallel within the scope of the present invention.

Assuming a production well 10 having the foregoing example physical characteristics, high pressure separator 14 will have an input temperature of brine and steam of approximately 454° F., with a pressure of approximately 330 psia, with a total flow of approximately 3,000,000 pounds per hour, consisting of approximately 1,908,076 pounds per hour of water, 325,724 pounds per hour of steam, 8,622 pounds of carbon dioxide and other noncondensable gases, approximately 78 pounds of hydrogen sulfide noncondensable gas, and approximately 757,500 pounds per hour of dissolved solids.

According to these example figures, at the inlet of high pressure separator 14, approximately 11 percent of the total brine content has flashed to steam, which represents approximately 14.6 percent of the water content of the brine. Such flashing has provided the motive power for driving the brine up through the well, and also provides the power for driving the brine through the flash crystallizer steam separators, and for driving the steam and noncondensables separated in separator 14 through the system of the invention for removing the noncondensables and recovering the heat from the separated steam.

It is estimated that about one-third of the available power generating energy, that is, the energy from steam capability, has already been flashed from the brine at the inlet of high pressure separator 14, and is separated from the brine in separator 14. This represents up to about half of the high pressure, high temperature steam available from the geothermal source.

The principal noncondensable gas components, removal of which is a primary concern of the present invention, are carbon dioxide which constitutes the majority of the noncondensables and is an acid gas which can be very harmful to turbine blades and nozzles, hydrogen sulfide, ammonia, and also some boric acid.

The principal components of the dissolved solids content are three primary salts of the brine which are sodium chloride, calcium chloride, and potassium chloride, and a large dissolved silica content, removal of the latter being the principal concern of applicant's aforesaid U.S. Pat. No. 4,665,705 and the aforesaid Featherstone U.S. Pat. No. 4,429,535.

High pressure separator 14 has a gas outlet conduit 16 which conducts the separated steam and noncondensable gases together to the noncondensable gas removal and heat recovery system of the present invention, which is generally designated 18. High pressure separator 14 also has a hot brine outlet conduit 19 which leads to the sequence of flash crystallizers. Thus, outlet brine conduit 19 leads to the bottom of an external vertical draft tube 20 associated with a high pressure, high temperature flash crystallizer 22. Preliminary flashing of the incoming hot brine in draft tube 20 provides recirculation motive power for operation of flash crystallizer 22 for both separating steam from the hot brine and precipitating silica out on particulate silica seed particles in the recirculating brine. The flashing brine is motivated upwardly by its flashing through external draft tube 20 into flash crystallizer 22 through crystallizer input conduit 24, and thence downwardly through the liquid brine content of crystallizer 22 and back into draft tube 20 through recirculation conduit 26. A seed particle conduit 28 provides silica particle seed sludge to recirculation conduit 26 from downstream of the sequence of flash crystallizers, preferably from a reactor-clarifier (not shown) such as is shown and described in applicant's aforesaid U.S. Pat. No. 4,665,705 and in the aforesaid Featherstone Pat. No. 4,429,535.

High pressure steam exits the high pressure, high temperature flash crystallizer 22 through a steam output conduit 30, passing through a demister screen system 32 which is provided with a high pressure wash water spray through a conduit 34. The high pressure steam passes through a scrubber 36, preferably of the centrifigal type known in the art as a Porta Test steam scrubber, and then passes through a high pressure steam conduit 38 to high pressure sides of a multiple stage steam turbine generally designated 40 which drives electric power generator 41. The exhaust of steam turbine 40 passes to a condensor system including a main conductor 42 through a pair of conduits 44. Condensor 42 is preferably a surface-type condensor, and has in its bottom a condensate-receiving hotwell 46 which receives the condensed steam from turbine 40. This condensed steam is substantially pure, containing a minimum of dissolved salts and incondensables from the brine. By way of comparison in the following description, the hotwell condensate will be referred to hereinafter as "sweet condensate." Condensor 42 is cooled by means of an associated cooling tower generally designated 47 to a minimum possible temperature and hence maximum vacuum, for maximum turbine power generation.

Outlet brine conduit 48 from flash crystallizer 22 leads to the bottom of external vertical draft tube 49 associated with a second flash crystallizer 50, which is of relatively low pressure and low temperature as compared to the first flash crystallizer 22. Preliminary flashing of the incoming brine in draft tube 49 provides recirculation motive power for steam separation and silica precipitation in crystallizer 50, the flashing brine being motivated upwardly by its flashing through draft tube 49 into crystallizer 50 through its input conduit 52, and thence downwardly through the brine in crystallizer 50 and back into draft tube 49 through recirculation conduit 54. Low pressure steam exits crystallizer 50 through a steam output conduit 56, passing through a demister screen system 58 that is provided with low pressure wash water spray through a conduit 60. The low pressure steam passes through a steam scrubber 62, such as a Porta Test scrubber, and then passes through a low pressure steam conduit 64 to low pressure sides of turbine 40.

The Noncondensable Gas Removal and Heat Recovery System

By way of example only and not of limitation, the noncondensable gas removal and heat recovery system 18 illustrated in the drawing and described hereinafter is a system suitable for the example geothermal production well 10 described above. The system 18 consists principally of a vertical thermosiphon reboiler, which is a heat exchanger, a steam separator drum in recirculating association with the thermosiphon reboiler, and a series of cross-exchange heat exchangers in communication with the reboiler and separator drum. The noncondensable gas removal and heat recovery system 18 synergistically recaptures most of the heat energy in the "sour steam" necessarily separated from the geothermal brine in high pressure horizontal separator 14 when the noncondensable gases are separated out of the brine, while at the same time separating the noncondensable gases out of the sour separated steam at the high temperature end of system 18 and dispersing them to the atmosphere. By removing the noncondensables from system 18 at its high temperature end, they are substantially eliminated from the "sour" hot water condensate flowing through the cross-exchangers of system 18 so as to not cause appreciable fouling of the cross-exchangers.

The separated steam from high pressure separator 14 is referred to as "sour steam" because of the presence of the noncondensable gases therein. Similarly, the sour steam which is condensed to water in system 18 is referred to herein as "sour condensate" because of a small amount of residual dissolved noncondensable gases in this condensate.

The separated sour steam and sour condensate therefrom give up most of their heat energy to make clean, sweet steam from turbine exhaust condensate which, being quite pure, is herein referred to as "sweet condensate."

The vertical thermosiphon reboiler is generally designated 66, and is the final high temperature heat exchanger in noncondensable gas removal and heat recovery system 18. The sour steam and noncondensable gases from high pressure horizontal separator 14 pass downwardly through the tube side of reboiler 66 in a single pass, heating the already cross-exchanger preheated sweet condensate to boiling in its shell side. In giving off heat to the sweet condensate, the sour steam condenses as it flows downwardly through the tube side of reboiler 66. After a series of passes of the sweet condensate through the shell side of reboiler 66, the sweet steam therefrom joins the high pressure, high temperature output steam from high pressure, high temperature flash crystallizer 22 to be conducted to the high pressure, high temperature sides of the turbine 40.

Reboiler 66 includes a cylindrical, vertically oriented outer shell 68 having respective upper and lower ends 70 and 72. Transverse, horizontal upper and lower tube sheets 74 and 76, respectively, within outer shell 68 have a series of parallel, vertical tubes 78 extending therebetween. An upper head chamber 80 is defined above upper tube sheet 74 within outer shell 68, and a lower head chamber 82 is defined below lower tube sheet 78 within outer shell 68. The upper ends of tubes 78 communicate with upper head chamber 80, while the lower ends of tubes 78 communicate with lower head chamber 82. The insides of vertical tubes 78, upper head chamber 80, and lower head chamber 82 are collectively referred to as the "tube side" of reboiler 66; while the space within outer shell 68 between tube sheets 74 and 76 and external of tubes 78 is referred to as the "shell side" 84 of reboiler 66.

Sour steam and noncondensable gases pass downwardly through the tube side of reboiler 66, with the steam fraction thereof condensing in its single traverse through the tube side, and most of the noncondensable gases therein separating out because of such steam condensation. Accordingly, the sour steam condensate accumulates in lower head chamber 82 of reboiler 66, with the noncondensable gases accumulating in lower head chamber 82 above the sour condensate level. At the same time, sweet condensate from turbine exhaust that has been preheated in the series of cross-exchangers flows upwardly through the shell side 84 of reboiler 66, boiling from heat given off by the condensing sour steam in the tube side of reboiler 66 and flowing upwardly under the natural circulation power of its boiling action.

It is possible that there may be a small amount of brine entrainment in the sour steam from high pressure separator 14, and this would have a tendency to foul the tube side of reboiler 66. Accordingly, a solvent chemical spray is applied through a solvent supply line 86 and a spray header 88 located in the top of upper head chamber 80 for continuously cleaning the tube side of reboiler 66 while it is in operation. A suitable solvent for such spraying is a solution of a complex ammonia salt employed by Dowell, a Dow Chemical subsidiary in Los Angeles, Calif., which performs industrial cleaning of heat exchangers and related equipment. By applying the solvent spray through header 88 in the top of upper head chamber 80, the spray is thereby applied down through tubes 78.

Sour steam outlet conduit 16 from high pressure separator 14 is directed into a steam scrubber 90, preferably of the Porta Test centrifigal type, which will remove most of the entrained brine from the sour steam. Preferably, a small amount of sweet condensate from condensor hotwell 46 is sprayed into sour steam conduit 16 before it enters scrubber 90 to aid the agglomeration of any fine foam or small droplets of brine coming from high pressure separator 14, for most effective scrubbing action of steam scrubber 90. This small amount of sweet condensate is provided to sour steam conduit 16 through a conduit 91. Outlet conduit 92 from scrubber 90 communicates with upper head chamber 80 so as to provide the sour steam to the upper end of the tube side of reboiler 66.

In the geothermal production well and plant example which is being given herein, the mixture of steam and noncondensables separated from the brine in high pressure separator 14 and directed to reboiler 66 has a temperature of approximately 454° F. with a pressure of approximately 330 psia. The total flow is approximately 334,331 pounds per hour, which includes approximately 325,724 pounds per hour of steam, approximately 8,532 pounds per hour of carbon dioxide and other noncondensable gases, plus approximately 75 pounds per hour of hydrogen sulfide. Since the total flow from production well 10 to high pressure separator 14 included 8,622 pounds per hour of carbon dioxide and other noncondensable gases, and approximately 78 pounds per hour of hydrogen sulfide, the vapor separated in high pressure separator 14 and directed to reboiler 66 includes approximately 98 percent of all of the noncondensable gases in the total flow. The remaining approximately 2 percent of noncondensables are dissolved in the brine which is delivered from separator 14 to the high pressure, high temperature flash crystallizer 22. Almost all of this small remaining dissolved fraction of noncondensable gases will remain in solution as the brine passes through flash crystallizers 22 and 50 and then through a reactor-clarifier and through a reinjection well back into the aquifer. Any part of this approximately 2 percent of the noncondensable gases which might be released from the brine in either or both of the flash crystallizers would be so minimal as to cause negligible fouling of the turbine and require minimal power to be pumped back up to atmospheric pressure from the turbine condensor system.

If substantially all of the undissolved noncondensable gases were to be released to the atmosphere from a high pressure, high temperature separator such as the separator 14 without the heat recovery system of the present invention, all of the heat energy of the associated steam would be wasted. In the present example, this would be all of the heat energy in the approximately 325,724 pounds of high pressure, high temperature steam passed from separator 14 to the heat recovery system of the invention which, as aforesaid, represents approximately 11 percent of the total brine flow from the production well, and approximately 14.6 percent of the water from the production well, representing about one-third of the potentially usable heat energy from steam derived from the production well.

Referring again to the vertical thermosiphon reboiler 66, horizontal line 94 located at an intermediate level within lower head chamber 82 represents the sour condensate level within lower head chamber 82 above which the noncondensable gases accumulate. In the example, these separated noncondensable gases are at a temperature of approximately 355° F. and a pressure of approximately 325 psia. The noncondensable gases are conducted from lower head chamber 82 through an outlet conduit 96 to the input of the tube side of a small heat exchanger 98 which serves as a preheater for the sweet condensate, the noncondensables being conducted from the tube side outlet of heat exchanger 98 through a conduit 100 for disposal to the atmosphere. Preferably, conduit 100 leads to cooling tower 47 for dispersal of the noncondensables with the large amount of air flowing through cooling tower 47 so that the noncondensable gases, and particularly the odorous hydrogen sulfide, are widely dispersed in the air.

The sweet condensate input to the present system from condensor hotwell 46 is through a conduit 102 which leads from hotwell 46 to the shell side input of heat exchanger 98. Heat transfer from the noncondensable gases to the incoming sweet condensate in heat exchanger 98 in effect squeezes the usable heat out of the noncondensable gases. A pair of pumps 104 and 106 in the sweet condensate conduit 102 pressurize the sweet condensate to a pressure of approximately 200 psia at the shell side inlet of heat exchanger 98 in the present example. The hotwell condensate temperature will vary according to atmospheric temperature variations which control the temperature of air flowing through cooling tower 47. An example shell side sweet condensate outlet temperature for heat exchanger 98 is approximately 117° F., at a pressure of approximately 190 psia. The preheated sweet condensate is conducted from the shell side outlet of heat exchanger 98 to the lowest temperature one of a series of cross-flow exchangers, hereinafter referred to as cross-exchangers, through which the preheated sweet condensate is further heated to proximate its boiling point at delivery pressure and is delivered to the input of the shell side of reboiler 66. Referring again to the flow of sweet condensate from condensor hotwell 46 through conduit 102, after the first pump 104, a branch conduit 107 delivers some of the sweet condensate to cooling tower 47 as makeup water.

The series of cross-exchangers includes a high temperature cross-exchanger 108, an intermediate temperature cross-exchanger 110, and a low temperature cross-exchanger 112. While three such cross-exchangers are shown and described herein, it is to be understood that any number of such cross-exchangers may be arrayed in series; or more than one series array of such cross-exchangers may be provided, with each series being arrayed in parallel with the other or others.

Cross-exchangers 108, 110 and 112 are arrayed in series with respect to both the sour condensate and the sweet condensate, the two condensates going countercurrent through the system of the three cross-exchangers 108, 110 and 112, and countercurrent through each of the cross-exchangers 108, 110 and 112, for most effective heat transfer. Also for most effective heat transfer from the successively cooling sour condensate to the successively heating sweet condensate, the sour condensate is passed through the tube sides of the cross-exchangers, while the sweet condensate is passed through the shell sides of the cross-exchangers. Thus, the very hot sour condensate from the tube side of reboiler 66 passes successively through the tube sides of cross-exchanger 108, cross-exchanger 110, and cross-exchanger 112; while the preheated sweet condensate from the shell side of preheater 98 passes successively through the shell sides of cross-exchanger 112, cross-exchanger 110, and cross-exchanger 108, bringing the preheated sweet condensate up close to boiling in cross-exchanger 108 for entry into and reboiling in the shell side of reboiler 66.

The series of cross-exchangers 108, 110 and 112 is the hydraulic and thermal equivalent of a single very long heat exchanger, which would be impractical.

Starting at the high temperature end of the series of cross-exchangers, the high temperature sour condensate which becomes condensed from the sour steam in tubes 78 of reboiler 66 passes from the reboiler lower head chamber 82 through a conduit 114 to the tube side inlet of high temperature cross-exchanger 108, and in the present example, this high temperature sour condensate is delivered to cross-exchanger 108 at a temperature of approximately 355° F. and a pressure of approximately 325 psia.

Hot, not-quite-boiling sweet condensate flows from the shell side outlet of high temperature cross-exchanger 108 through a conduit 116 to a steam separator drum 118 which is coupled to the shell side 84 of reboiler 66 in a recirculating loop for flashing the sweet condensate into steam. The upper end of reboiler shell side 84 is coupled generally centrally to separator drum 118 through a conduit 120, while the lower end of separator drum 118 is coupled to the lower end of reboiler shell side 84 through a recirculation conduit 122. The almost-boiling sweet condensate from cross-exchanger 108 shell side enters separator drum 118 at a relatively low point therein, considerably below the entry of conduit 120 from the upper end of reboiler shell side 84.

Reboiler shell side 84 and steam separator drum 118 are thus coupled together in a natural recirculation loop, and for most effective recirculation between them they are closely placed physically, with separator drum 118 placed proximate the top of reboiler 66. Sweet condensate flows downwardly from the bottom of steam separator drum 118 through conduit 122 to the lower end of reboiler shell side 84, boils upwardly through reboiler shell side 84 under the power of flashing steam generated by heat from the tube side of reboiler 66, and the flashed steam and entrained sweet condensate flow upwardly out of the top of reboiler shell side 84 through conduit 120 into separator 118. Unflashed sweet condensate from the top of reboiler shell side 84 has fresh almost-boiling sweet condensate added to it from high temperature cross-exchanger 108 through conduit 116, and this natural recirculation process continues. Circulation of sweet condensate through this recirculation loop may be on the order of from about 5 to about 20 times as steam is flashed therefrom, depending upon how much resistance to flow is placed in the loop. The less resistance to flow, the greater the number of times the sweet condensate will circulate.

The flashed sweet steam separated from the sweet condensate in separator drum 118 leaves the top of drum 118 through a conduit 124 which connects with the high pressure steam output conduit 30 from high pressure, high temperature flash crystallizer 22, being conducted through scrubber 36 and high pressure steam conduit 38 to the high pressure sides of turbine 40.

Partially cooled sour condensate passes from the tube side outlet of high temperature cross-exchanger 108 to the tube side inlet of intermediate temperature cross-exchanger 110 through a conduit 126, having given up a portion of its heat to sweet condensate in the shell side of high temperature cross-exchanger 108. In the present example, the sour condensate leaves cross-exchanger 108 and enters cross-exchanger 110 at a temperature of approximately 338° F. and a pressure of approximately 120 psia. The partially heated sweet condensate from intermediate temperature cross-exchanger 110 passes from the shell side outlet of cross-exchanger 110 through a conduit 128 to the shell side inlet of cross-exchanger 108, and in the present example, it is at a temperature of approximately 325° F. and a pressure of approximately 150 psia.

Sour condensate from the tube side of intermediate cross-exchanger 110, which has given up heat to sweet condensate in the shell side of cross-exchanger 110, leaves cross-exchanger 110 through its tube side outlet and passes through a conduit 130 to the tube side inlet of cross-exchanger 112, and in the present example, it is at a temperature of approximately 228° F. and a pressure of approximately 100 psia. The sweet condensate which has been partially heated in low temperature cross-exchanger 112 passes from the shell side outlet of cross-exchanger 112 through a conduit 132 to the shell side inlet of cross-exchanger 110, and in the present example, it will have a temperature of approximately 208° F. and a pressure of approximately 180 psia.

The thermally spent sour condensate leaves low temperature cross-exchanger 112 through its tube side outlet through a disposal conduit 134 which preferably provides the spent sour condensate to the cooling tower 47 as makeup water. Preheated sweet condensate is delivered from the shell side outlet of preheater heat-exchanger 98 through a conduit 136 to the shell side inlet of low temperature cross-exchanger 112, and in the example, it is at a temperature of approximately 117° F. and a pressure of approximately 190 psia.

While the high temperature sweet condensate which circulates in the recirculation loop consisting of reboiler shell side 84, conduit 120, steam separator drum 118, and recirculation conduit 122 is relatively very pure, it nevertheless may contain a small amount of entrained impurities. Because of the continuous recirculation of this sweet condensate between reboiler 66 and separator drum 118, any such entrained impurities will accumulate in the recirculation loop unless they are removed. Such removal is accomplished by purging a small quantity of sweet condensate from separator drum 118 through a "blow-down" conduit 138 which leaves separator drum 118 at a level intermediate the connection levels of conduits 120 and 116, and communicates with conduit 126 which delivers sour condensate from the tube side outlet of high temperature cross-exchanger 108 to the tube side inlet of intermediate temperature cross-exchanger 110. In this way, the heat energy of the blow-down condensate is conserved and is transferred to sweet condensate in the intermediate and low temperature cross-exchangers 110 and 112, respectively.

Low pressure wash water is preferably sprayed into the sour condensate being delivered to the tube side inlet of low temperature cross-exchanger 112 as an anti-fouling measure. Such low pressure wash water may be residual water obtained from low pressure steam scrubber 62 and delivered through a conduit 140 to sour condensate conduit 130 which connects to the tube side inlet of cross-exchanger 112. This will also conserve heat from such residual water. High temperature, high pressure residual water is delivered as wash water from steam scrubber 36 to the tube side inlet of intermediate temperature cross-exchanger 110 through conduits 141 and 126, heat from such wash water being utilized in cross-exchangers 110 and 112. Similarly, by suitable valving, at least a portion of the high temperature, high pressure residual water from steam scrubber 90 may be delivered to the tube side inlet of intermediate temperature cross-exchanger 110 through conduits 142, 144 and 126, both as an anti-fouling measure and to conserve heat energy from such water, while the remainder of such water may be delivered through conduit 142 to cooling tower makeup conduit 134.

Advantages of the Invention

Removal of almost all of the noncondensable gases at the high temperature end of the geothermal power generating plant has the following important advantages.

1. More net energy is producable because of a drastic reduction of energy requirements for the turbine vacuum system. The deeper the vacuum that can be drawn in the turbine condensor system, the greater the power derivable by the turbine. With a conventional plant where the noncondensables are not removed at the high temperature end of the plant but are allowed to pass through the plant mixing with the steam that drives the turbine, the noncondensable gases will accumulate in the condensor system unless they are removed from the condensor system by being compressed up to a pressure sufficient to reject them to the atmosphere. When the steam from the turbine exhaust condenses to water, the noncondensables by definition remain in gaseous form.

Compression of the noncondensables can be accomplished with a vacuum pump, ejectors, centrifigal compressors, or any combination of such devices. Typically, both pumps and ejectors are used. Such ejectors are inefficient and require a large amount of motive steam which, of course, is then not available for powering the turbine. For example, in a conventional plant having a net output of approximately 34 megawatts, about 25,000 pounds per hour or more of motive steam would be required for the ejectors. By way of comparison, in a plant of comparable size embodying the present invention, only about 500 pounds or less per hour of motive steam would be required for ejectors, which is a 50:1 or more ratio of savings of motive steam. The small ejector requirement for a plant embodying the present invention is primarily for removal of air which typically may enter from the atmosphere through leaks in the condensor system. Any slight amount of noncondensables that might possibly have been released from the brine in either or both of the flash crystallizers will be pressurized and released to the atmosphere along with any such leakage air.

In the region of the example geothermal plant, i.e., the Salton Sea geothermal field, with the noncondensable gases separated out at the high temperature end of the plant, the vacuum in the condensor system can be drawn down to approximately one inch of mercury in the wintertime, and approximately three inches of mercury in the summertime. To attempt to maintain such a very low pressure vacuum in the condensor system of a conventional plant where the noncondensables are mixed with the steam that drives the turbine, the noncondensables would have to be compressed up from about 1–3 inches of mercury to about 30 inches of mercury, which is atmospheric pressure, for release to the atmosphere. Accordingly, to handle the noncondensables, the pressurizing system is required to produce a compression ratio of from about 30:1 to about 10:1, which is a large amount of pressurization.

2. Additional energy is generated by the turbine with the system of the present invention because a better vacuum is drawn in the condensor system without the presence of the noncondensable gases. With prior art geothermal power plants, even though the noncondensables are pressurized and ejected from the condensor system, some of them are always present in the condensor system and result in a poor vacuum being achieved at the turbine exhaust.

By way of example only, and not of limitation, for comparable power plants with and without the present invention having gross power outputs of 38 megawatts, the plant having the present invention will produce a net output of more than 35.2 megawatts, while the prior art plant will have a net output of approximately 34 megawatts, representing a more than 1.2 megawatt improvement in performance with the use of the present invention. Such improvement results from the cumulative energy savings from not having to compress the noncondensables back up to atmospheric pressure and from being able to draw a deeper vacuum without the noncondensables in the condensor system.

3. With the present invention, the main turbine surface condensor may be considerably smaller in size than the main surface condensor of a conventional geothermal plant of overall comparable size, representing a substantial reduction in capital cost for the surface condensor. This is because the presence of noncondensable gases in the steam in a conventional plant lowers the condensing heat transfer coefficient from what it is without the noncondensables.

4. Another, quite large saving in capital cost is in the compression system of pumps and ejectors associated with the condensor system, since they need have only about 1/50th or less of the compressing capacity for a plant with the present invention as for a conventional plant.

5. A still further capital cost saving with the present invention is in the metallurgy requirements for the turbine. In conventional plants, the large quantity of acid gases making up most of the noncondensables tend to be very corrosive in the turbine so that it is necessary to make the turbine out of exotic and expensive metals to try to combat the corrosion. With the present invention, there are essentially no acid gases at all in the steam, so that the potential for corrosion is a great deal less than for conventional plants. This also results in a substantial overall capital replacement cost reduction over the operational life of a plant embodying the present invention.

6. With the present invention, the potential for fouling turbine blades and nozzles with salts is greatly reduced, for several reasons. First, the sweet condensate that is reheated to steam in the present invention is relatively very free of entrained salt content. Second, substantial elimination of noncondensables from the turbine steam substantially eliminates chemical reactions between various constituents of the noncondensables which would otherwise have a high potential for producing a variety of salts. For example, in a conventional plant with the noncondensables present in the turbine steam, there was the possibility of ammonia reacting with boric acid to make ammonium borate, or reacting with hydrogen sulfide to make ammonium sulfide, or reacting with carbon dioxide to make ammonium carbamate. Third, with the noncondensables present in the turbine steam, there was also the potential for reaction products to be produced between noncondensables and the equipment, as for example hydrogen sulfide reacting with iron to make iron sulfide.

While the present invention has been shown and described herein in what is conceived to be the most practical and preferred embodiment, it is recognized that departures may be made therefrom within the scope of the invention, which is therefore not to be limited to the details disclosed herein, but is to be accorded the full scope of the appended claims.

I claim:

1. In a geothermal electric power generating plant of the type wherein a primary flow stream of hot geothermal brine from production well means is partially flashed to steam for turbine motive power, a system for removing noncondensable gases from said flow stream, which comprises:

heat exchange means;

separator means in said primary flow stream for diverting from said primary flow stream a secondary flow stream comprising a mixture of noncondensable gases and some steam, said separator means being connected to said heat exchange means for delivery of said secondary flow stream to said heat exchange means and flow of said secondary flow stream through said heat exchange means; and a source of supply of substantially pure water in communication with said heat exchange means for delivery of said substantially pure water to said heat exchange means and flow thereof through said heat exchange means in a flow path that is separate from the flow path of said secondary flow stream through said heat exchange means;

heat from said steam in said secondary flow stream being transferred in said heat exchange means to said substantially pure water causing said substantially pure water to boil for use as turbine motive steam, the resulting heat loss from said steam of said secondary flow stream causing said steam of said secondary flow stream to condense and thereby become separated from said noncondensable gases.

2. The system of claim 1, wherein said separator means is located proximate the high temperature end of said plant.

3. The system of claim 1, wherein said source of supply of substantially pure water comprises turbine exhaust condensor hotwell means.

4. The system of claim 1, wherein said heat exchange means comprises substantially vertical thermosiphon reboiler means.

5. The system of claim 1, wherein said heat exchange means comprises a plurality of heat exchangers arranged in series;

said substantially pure water flowing generally countercurrent to said steam of said secondary flow stream and its condensate through said series of heat exchangers, with said connection from said separator means to said heat exchange means being to a relatively high temperature one of said heat exchangers, and said communication from said source of supply of substantially pure water to said heat exchange means being to a relatively low temperature one of said heat exchangers.

6. The system of claim 5, wherein said relatively high temperature one of said heat exchangers comprises substantially vertical thermosiphon reboiler means.

7. The system of claim 5, wherein said communication between said source of supply of substantially pure water and said relatively low temperature one of said heat exchangers comprises preheater heat exchanger means for preheating said substantially pure water; and gas outlet conduit means from said relatively high temperature one of said heat exchangers to said preheater heat exchanger means for delivering said separated gases to said preheater heat exchanger means wherein heat energy from said noncondensable gases is transferred to said substantially pure water.

8. The system of claim 1, wherein said heat exchange means comprises tube side means and shell side means;
said noncondensable gases and condensing steam of said secondary flow stream passing through said tube side means, and said boiling substantially pure water passing through said shell side means.

9. The system of claim 1, wherein said noncondensable gases and condensing steam of said secondary flow stream flow generally downwardly through said heat exchange means, and said substantially pure boiling water flows generally upwardly through said heat exchange means under the power of its boiling action.

10. The system of claim 9, which comprises steam separator means operatively coupled with said heat exchange means in a fluid recirculation loop for circulation of said substantially pure boiling water boiling water a plurality of times successively through said heat exchange means and said steam separator means;
said steam separator means having steam outlet conduit means for turbine motive steam.

11. The system of claim 10, wherein said recirculation loop has a fluid flow resistance such as to cause said substantially pure boiling water to circulate through said loop in the range of from about 5 to about 20 times.

12. The system of claim 10, wherein said steam separator means comprises steam separator drum means.

13. The system of claim 10, wherein said heat exchange means comprises substantially vertical thermosiphon reboiler means.

14. The system of claim 10, wherein said communication between said source of supply of substantially pure water and said heat exchange means is via said steam separator means.

15. The system of claim 9, wherein lower head chamber means is defined within said heat exchange means within which said condensed steam and noncondensable gases of said secondary flow stream are collected;
liquid outlet conduit means in communication with said lower head chamber means below the surface level of said condensed steam of said secondary flow stream for removal of said condensed steam of said secondary flow stream from said lower head chamber means; and
gas outlet means in communication with said lower head chamber means above the surface level of said condensed steam of said secondary flow stream for removal of said noncondensable gases of said secondary flow stream from said lower head chamber means.

16. The system of claim 1, which comprises gas outlet conduit means from said heat exchange means for delivering said noncondensable gases of said secondary flow stream to cooling tower means of said plant for distribution of said noncondensable gases into the flow of air through said cooling tower means for dispersal of said noncondensable gases into the atmosphere.

17. The system of claim 1, wherein said communication between said source of supply of substantially pure water and said heat exchange means comprises preheater heat exchanger means for preheating said substantially pure water; and
gas outlet conduit means from said heat exchange means to said preheater heat exchanger means for delivering said noncondensable gases of said secondary flow stream to said preheater heat exchanger means wherein heat energy from said noncondensable gases is transferred to said substantially pure water.

18. The system of claim 1, which comprises liquid outlet conduit means from said heat exchange means for conducting said condensed steam of said secondary flow stream from said heat exchange means; and
gas outlet conduit means from said heat exchange means for conducting said noncondensable gases of said secondary flow stream from said heat exchange means substantially independently of said condensed steam of said secondary flow stream.

19. The system of claim 18, wherein said communication between said source of supply of substantially pure water and said heat exchange means comprises further heat exchange means for heating said substantially pure water preparatory to its entry into said heat exchange means;
said liquid outlet conduit means from said first-mentioned heat exchange means being connected to said further heat exchange means for delivery of said condensed steam from said secondary flow stream to said further heat exchange means and transfer therein of heat energy from said condensed steam from said secondary flow stream to said substantially pure water.

20. The system of claim 19, wherein said substantially pure water and said condensed steam from said secondary flow stream flow in generally countercurrent relationship through said further heat exchange means.

21. The system of claim 19, wherein said further heat exchange means comprises a plurality of heat exchangers in series.

22. The system of claim 21, wherein said substantially pure water and said condensed steam from said secondary flow stream flow in generally countercurrent relationship through said series of heat exchangers.

23. The system of claim 22, wherein said substantially pure water and said condensed steam from said secondary flow stream flow in generally countercurrent relationship through each individual one of said series of heat exchangers.

24. The system of claim 19, wherein said communication between said source of supply of substantially pure water and said first-mentioned heat exchange means also comprises preheater heat exchange means upstream of said further heat exchange means for preheating said substantially pure water prior to its delivery to said further heat exchange means;
said gas outlet conduit means from said first-mentioned heat exchange means being connected to said preheater heat exchanger means for delivery of said noncondensable gases of said secondary flow stream to said preheater heat exchanger means and transfer therein of heat energy from said noncondensable gases of said secondary flow stream to said substantially pure water.

25. The system of claim 19, wherein said noncondensable gases and condensing steam of said secondary flow stream flow generally downwardly through said first-mentioned heat exchange means and said substantially pure boiling water flows generally upwardly through said first-mentioned heat exchange means under the power of its boiling action; and
steam separator means operatively coupled with said first-mentioned heat exchange means in a fluid recirculation loop for circulation of said substantially pure boiling water a plurality of times successively through said first-mentioned heat exchange means and said steam separator means;

said steam separator means having steam outlet conduit means for turbine motive steam.

26. The system of claim 25, wherein said substantially pure water which has been heated in said further heat exchange means is flowed from said further heat exchange means to said first-mentioned heat exchange means via said steam separator means.

27. The system of claim 25, wherein said first-mentioned heat exchange means comprises substantially vertical thermosiphon reboiler means.

28. In a geothermal electric power generating plant of the type wherein a primary flow stream of hot geothermal brine from production well means is partially flashed to steam for turbine motive power, a method for removing noncondensable gases from said flow stream, which comprises:

diverting from said primary flow stream a secondary flow stream comprising a combination of noncondensable gases and some steam;

providing a source of supply of substantially pure water; and passing said substantially pure water in heat exchange relationship to said secondary flow stream such that heat from the steam of said secondary flow stream is transferred to said substantially pure water so as to cause said substantially pure water to boil for use as turbine motive steam, and the resulting heat loss from said steam of said secondary flow stream causes said steam of said secondary flow stream to condense and thereby become separated from said noncondensable gases.

29. The method of claim 28, wherein said separating is performed proximate the high temperature end of said plant.

30. The method of claim 28, wherein said source of supply of substantially pure water comprises turbine exhaust condensor hotwell means.

31. The method of claim 28, wherein said heat exchange relationship is established, at least in part, in substantially vertical thermosiphon reboiler means.

32. The method of claim 28, wherein said passing of said substantially pure water in heat exchange relationship to said noncondensable gases and steam of said secondary flow stream is performed in a plurality of heat exchange stages that are in series;

said substantially pure water flowing generally countercurrent to said steam of said secondary flow stream and its condensate through said heat exchange stages, with said noncondensable gases and steam of said secondary flow stream being first provided to a relatively high temperature one of said heat exchange stages, and said substantially pure water being first provided to a relatively low temperature one of said heat exchange stages.

33. The method of claim 32, wherein said relatively high temperature one of said heat exchange stages is established, at least in part, in substantially vertical thermosiphon reboiler means.

34. The method of claim 32, which comprises, before said substantially pure water is provided to said relatively low temperature one of said heat exchange stages, preheating said substantially pure water by passing it in heat exchange relationship to said noncondensable gases of said secondary flow stream.

35. The method of claim 28, wherein said heat exchange relationship is established in heat exchange means comprising tube side means and shell side means;

said noncondensable gases and condensing steam of said secondary flow stream being passed through said tube side means, and said boiling substantially pure water being passed through said shell side means.

36. The method of claim 28, which comprises, in said heat exchange relationship, flowing said noncondensable gases and steam of said secondary flow stream generally downwardly, and flowing said substantially pure boiling water generally upwardly under the power of its boiling action.

37. The method of claim 36, which comprises establishing a recirculation loop for said substantially pure boiling water in which said substantially pure boiling water flows generally upwardly in said heat exchange relationship, thence through steam separator means, and thence back into said heat exchange relationship;

circulating said substantially pure boiling water through said recirculation loop a plurality of times; and removing steam from said steam separator means for use as turbine motive power.

38. The method of claim 37, wherein said substantially pure boiling water is circulated through said recirculation loop in the range of from about 5 to about 20 times.

39. The method of claim 37, wherein said steam separator means comprises steam separator drum means.

40. The method of claim 37, wherein said heat exchange relationship is established, at least in part, in substantially vertical thermosiphon reboiler means.

41. The method of claim 37, which comprises delivering said substantially pure water from said source of supply thereof to said steam separator means, and hence into said recirculation loop and thereby into said heat exchange relationship.

42. The method of claim 36, which comprises collecting said condensed steam and noncondensable gases of said secondary flow stream in chamber means after they have flowed generally downwardly in said heat exchange relationship;

establishing a surface level of said condensed steam of said secondary flow stream in said chamber means; and removing said noncondensable gases of said secondary flow stream from said chamber means from above said surface level.

43. The method of claim 42, which comprises preheating said substantially pure water before it is passed in said heat exchange relationship, said preheating being accomplished by passing said substantially pure water in heat exchange relationship with said removed noncondensable gases.

44. The method of claim 28, which comprises delivering said noncondensable gases to cooling tower means of said plant and distributing said gases into the flow of air through said cooling tower means for dispersal of said gases into the atmosphere.

45. The method of claim 28, which comprises conducting said condensed steam and said noncondensable gases of said secondary flow stream in separate respective liquid and gas streams away from the region of said heat exchange relationship.

46. The method of claim 45, which comprises heating said substantially pure water before it is passed into said heat exchange relationship, said heating being accomplished by passing said substantially pure water in heat exchange relationship with said liquid stream of condensed steam from said secondary flow stream.

47. The method of claim 46, wherein said substantially pure water and said liquid stream of condensed steam from said secondary flow stream flow in generally countercurrent relationship in their said heat exchange relationship.

48. The method of claim 46, wherein said passing of said substantially pure water in heat exchange relationship with said liquid stream of condensed steam from said secondary flow stream is performed in a plurality of heat exchange stages that are in series.

49. The method of claim 48, wherein said substantially pure water and said liquid stream of condensed steam from said secondary flow stream flow in generally countercurrent relationship through said series of heat exchange stages.

50. The method of claim 49, wherein said substantially pure water and said liquid stream of condensed steam from said secondary flow stream flow in generally countercurrent relationship through each individual one of said heat exchange stages.

51. The method of claim 46, which comprises preheating said substantially pure water before it is passed in heat exchange relationship with said liquid stream of condensed steam from said secondary flow stream, said preheating being accomplished by passing said substantially pure water in heat exchange relationship with said gas stream of noncondensable gases from said secondary flow stream.

52. The method of claim 46, which comprises, in said first-mentioned heat exchange relationship, flowing said noncondensable gases and steam of said secondary flow stream generally downwardly, and flowing said substantially pure boiling water generally upwardly under the power of its boiling action;
establishing a recirculation loop for said substantially pure boiling water in which said substantially pure boiling water flows generally upwardly in said first-mentioned heat exchange relationship, thence through said steam separator means, and thence back into said first-mentioned heat exchange relationship;
circulating said substantially pure boiling water through said recirculation loop a plurality of times; and
removing steam from said steam separator means for use as turbine motive power.

53. The method of claim 52, which comprises flowing said substantially pure water which has been heated in said heat exchange relationship with said liquid stream of condensed steam from said secondary flow stream to said first-mentioned heat exchange relationship via said steam separator means.

54. The method of claim 52, wherein said first-mentioned heat exchange relationship is established, at least in part, in substantially vertical thermosiphon reboiler means.

* * * * *